Jan. 20, 1953
F. H. ALLMAN-WARD
2,626,058
ROTARY DRUM SUCTION FILTER
Filed Nov. 12, 1948
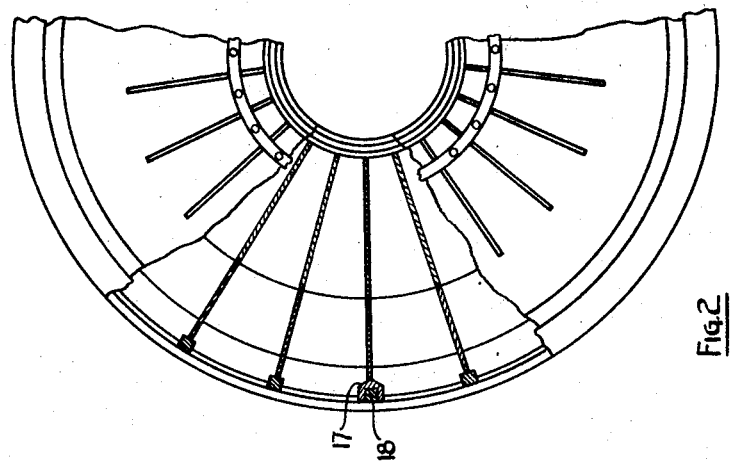
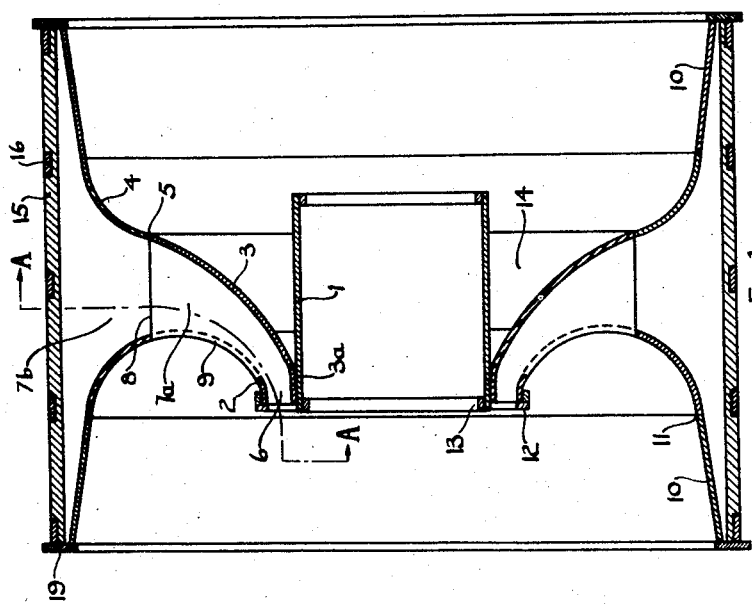
FREDERICK HERBERT ALLMAN-WARD Inventor
By  Attorney Patented Jan. 20, 1953

2,626,058

UNITED STATES PATENT OFFICE 2,626,058

ROTARY DRUM SUCTION FILTER

Frederick H. Allman-Ward, Colchester, England, assignor to Davey, Paxman and Company Limited, Colchester, England, a British company Application November 12, 1948, Serial No. 59,673
In Great Britain June 23, 1947

2 Claims. (Cl. 210—199)

This invention relates to rotary drum suction filters and more particularly to filters of the kind wherein the drum is formed with internal cells or pockets of approximate trumpet shape connecting its peripheral surface, upon which the filter screen is mounted, to an annular port or series of ports arranged at one end of the drum and adapted in use to be connected to a source of suction.

Heretofore, drum filters of this type have been constructed mainly of castings with consequential heavy weight and high manufacturing cost and it is the main object of the present invention to provide a novel form of drum filter which may be fabricated from sheet material, with or without pressing operations, and in which the drum parts are so constructed and arranged that their assembly by welding operations may be easily carried out.

Another object of the invention is to provide an improved form of fabricated drum filter which is simple and cheap to construct and which at the same time preserves the streamline form of the trumpet shape cells thus ensuring smooth flow of air and filtrate.

A still further object of the invention is to provide an improved method of fabricating drum filters which enables filters of different sizes to be readily constructed from a relatively few standard components.

According to the invention the improved rotary drum filter comprises co-axial unitary or sectional end plates so shaped and disposed as to define between them an annular space of approximate trumpet shape cross section, and a plurality of radially extending partitions, formed in sections if desired, carrying filter screen supporting means on their outer ends and dividing said annular space into a series of cells, said partitions being welded to the end plates so as to locate them in their relative positions and to form with said end plates in integral unitary structure.

The end plates may consist of two or more annular steel pressings so shaped and disposed as to define the inner and outer curved walls of the trumpet shape space, or said end walls may each consist of a series of sector shape plates welded at their side edges to the partitions and providing individual end closures to the cells.

Reference will now be made to the accompanying drawings in which one embodiment of the invention is illustrated and wherein:

Fig. 1 is an axial section through the filter, and

Fig. 2 is an end view of the filter, part thereof being in section taken on the line A—A of Fig. 1.

The construction shown comprises a cylindrical shell or hub member 1 upon which the cell structure is mounted and which is supported for rotation in any suitable manner. The ends of the cell structure are provided by three annular steel pressings 2, 3, 4 respectively, the pressing 2 being of substantially semi-circular form in radial cross section and defining the inner or more sharply curved wall of the trumpet shape space whilst the opposite wall of the said space is defined by the inner pressing 3 of frusto-conical form but with a slightly concave wall and the outer pressing 4 of frusto-hemispherical form, said pressings 3, 4 being united edge to edge by a welded joint 5. The pressing 3 includes a short axial extension 3a which is welded to the hub member 1 and which co-operates with the inner edge of pressing 2 to form the annular suction port 6. The annular space enclosed by the pressings is divided into cells by a series of trumpet shape radial partitions formed of steel plate, said partitions consisting each of an inner snail-form section 7a extending along the narrow portion or throat of the annular space and an outer section 7b of substantially T-form which is welded edge to edge at 8 to the inner section and completes the division of said space outwards to the periphery of the drum. The partitions are welded along their edges to the pressings 2, 3, 4 and to facilitate this operation the pressing 2 is slotted radially to receive tongues 9 extending along substantially the whole length of the adjacent edges of partitions sections 7a whereby the welding of these joints may be effected from the outside. The drum is extended to the desired length by frusto-conical rings 10, preferably formed by rolling and welding operations, which are welded edge to edge at 11 to the rim portions of the pressings 2, 4, the partition sections 7b being of such length as to extend completely across the mouth of the trumpet shape space defined by the pressings and rings.

The annular suction port structure may be reinforced by a welded-on bracing ring 12 and stiffening rings 13 may be welded within the ends of hub member 1, whilst additional rigidity between said hub member and the cell structure may be provided by bracing struts 14 welded to the inner surface of pressing 3 and to the hub member. If desired, internal bracing for the partitions may be provided in the form of welded-on struts spanning the trumpet cells at or about their mid-points.

To support the filter screen a bar 15 is welded on to the outer edge of each partition, section 7b, preferably before assembly, and after assembly these edge bars are inter-connected by a number of rings or hoops 16 recessed into the bars and welded thereto. In this manner a continuous surface of mesh form is provided upon the periphery of the drum for reception of the filter screen. The screen may be retained upon the drum in any suitable manner, for example, two or more of the edge bars may be socketed as at 17 to receive the ends of the filter cloth, said ends being retained in the sockets by a removable clamping bar 18 or equivalent means.

To give good rigidity to the ends of the structure, the ends of the edge bars 15 are united to the adjacent edges of rings 10 by welded-on rings 19, these rings 19 constituting the end rims of the drum.

The method of construction is as follows:

Pressing 3 is first welded to hub 1, together with the bracing struts 14 if provided, and the pressing 4 then united to pressing 3. Inner partition sections 7a are next welded to pressing 3 in the desired spaced relation and pressing 2 then offered to the assembly, the tongues 9 being entered in the slots in the pressing and being welded to the pressing. The ring-like extensions 10 are now welded to the pressings 2, 4, although they may be applied at an earlier stage if so desired, and outer partition sections 7b are then secured in position by welding to the inner sections 7a, to the pressings 2, 4 and to the outer surfaces of the extensions 10. The edge bars 15 may be welded to the partition sections 7b if not already applied and the hoops 16 and rims 19 are subsequently welded in position to complete the peripheral structure of the drum.

In applying the bracing ring 12 to the annular suction port, any desired coupling means for co-operating fluid conduits may be embodied therewith and the ring 13 may also be braced by radial webs extending across the annular porting if desired. It will be seen that with the construction described the fabricated cell structure constitutes the central or mid-portion of the drum, the rings 10 extending the drum to the desired axial length. Thus filters of differing length may be readily constructed by selecting extension of appropriate length and welding them to a standard mid-section unit, the only modification of such unit residing in the choice of suitable length outer partition sections 7b.

I claim:

1. In a rotary drum type filter having a central hub and an outer cylindrical filter screen with a filter cell structure connected between the hub and screen in the form of an annular assembly of circumferentially adjacent filter cells each extending radially from the hub and defining the filter suction outlets, the improvement which consists in building up the filter cells from separate metal pressings welded together in edge to edge relation, said metal pressings being frusto-conical in diametral cross section and comprising common annular pressings axially spaced with respect to said hub and forming the cell side walls and partition plate sections fastened between said walls to extend radially between the hub and outer screen so as to define the separate cells, at least one said cell side wall being formed by separate annular pressings welded together in edge to edge radially co-extensive relationship, said partition plate sections being composed of inner and outer plate sections also welded together in radially co-extensive edgewise relationship and said separate annular plates of the one side wall of the cell assembly being welded together along a joint line which is coincident with the joint line between the partition plate sections.

2. In a rotary drum type filter having a central hub and an outer cylindrical filter screen with a filter cell structure connected between the hub and screen in the form of an annular assembly of circumferentially adjacent filter cells each extending radially from the hub and defining the filter suction outlets, the improvement which consists in building up the filter cells from separate metal pressings welded together in edge to edge relation, said metal pressings being frusto-conical in diametral cross section and comprising common annular pressings axially spaced with respect to said hub and forming the cell side walls and partition plate sections fastened between said walls to extend radially between the hub and outer screen so as to define the separate cells, one said cell side wall being composed of separate annular pressings welded together in edge to edge radially co-extensive relationship and the opposite cell side wall having radially extending slots at circumferentially spaced intervals, said partition plate sections being composed of inner and outer plate sections also welded together in radially co-extensive edgewise relationship, said inner partition plate sections being engaged in said slots along their corresponding edges, and said separate annular plates of the one side wall of the cell assembly being welded together along a joint line which is coincident with the joint line between the partition plate sections.

FREDERICK H. ALLMAN-WARD.

REFERENCES CITED

The following references are of record in the file of this patent:

UNITED STATES PATENTS

| Number | Name | Date |
|---|---|---|
| 1,075,736 | Spiegel | Oct. 14, 1913 |
| 1,273,791 | Knowles | July 23, 1918 |
| 1,393,335 | Baldwin | Oct. 11, 1921 |
| 1,705,226 | Notz | Mar. 12, 1929 |
| 1,748,081 | Reed et al. | Feb. 25, 1930 |
| 2,204,928 | Culver | June 18, 1940 |
| 2,243,585 | Fowler et al. | May 27, 1941 |
| 2,406,177 | Vokes et al. | Aug. 20, 1946 |

FOREIGN PATENTS

| Number | Country | Date |
|---|---|---|
| 178,831 | Great Britain | Apr. 12, 1922 |
| 358,076 | Great Britain | Oct. 5, 1931 |
| 608,181 | Germany | Jan. 30, 1935 |